(12) United States Patent
Heffelbower

(10) Patent No.: US 9,061,460 B2
(45) Date of Patent: Jun. 23, 2015

(54) SKIN-COVERED ARTICLES WITH REACTION INJECTION MOLDED FOAM LAYER

(75) Inventor: Steven W. Heffelbower, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 418 days.

(21) Appl. No.: 13/527,997

(22) Filed: Jun. 20, 2012

(65) Prior Publication Data

US 2013/0341817 A1   Dec. 26, 2013

(51) Int. Cl.
*B29C 33/48* (2006.01)
*B29C 44/58* (2006.01)
*B29C 45/14* (2006.01)
*B29C 44/12* (2006.01)
*B29C 44/34* (2006.01)
*B29C 45/34* (2006.01)
*B29L 31/30* (2006.01)
*B29K 75/00* (2006.01)

(52) U.S. Cl.
CPC ............... *B29C 44/588* (2013.01); *B29C 45/34* (2013.01); *B29L 2031/3008* (2013.01); *B29C 45/14065* (2013.01); *B29C 45/14467* (2013.01); *B29L 2031/3014* (2013.01); *B29C 2045/14155* (2013.01); *B29C 2045/14532* (2013.01); *B29C 2045/14606* (2013.01); *B29C 2045/14967* (2013.01); *B29K 2075/00* (2013.01); *B29C 44/1228* (2013.01); *B29C 44/351* (2013.01)

(58) Field of Classification Search
USPC ........ 264/45.2, 45.1, 45.4, 46.5, 46.6, 50, 51, 264/241, 261, 263
See application file for complete search history.

(56) References Cited

U.S. PATENT DOCUMENTS

| | | | |
|---|---|---|---|
| 6,315,295 B1 * | 11/2001 | Sym | ................ 277/312 |
| 6,457,739 B1 | 10/2002 | Dailey et al. | |
| 7,332,207 B2 | 2/2008 | Bondar et al. | |
| 7,534,483 B2 | 5/2009 | Nelias | |
| 7,806,450 B2 | 10/2010 | Johnson et al. | |
| 2006/0127636 A1 * | 6/2006 | Bondar et al. | ................ 428/119 |
| 2009/0202775 A1 | 8/2009 | Iriyama et al. | |

FOREIGN PATENT DOCUMENTS

EP          0726130 B1      1/2001

* cited by examiner

*Primary Examiner* — Stella Yi
(74) *Attorney, Agent, or Firm* — Damian Porcari; MacMillan, Sobanski & Todd, LLC

(57) ABSTRACT

A composite article is formed with a reaction-injection mold (RIM) foam layer between a substrate and a flexible skin in a RIM tool having at least one inflatable seal defining an edge of the foam layer. The RIM tool is clamped in a fully closed position. A reactive mixture is injected into a space between the substrate and skin with the inflatable seal being deflated. The inflatable seal is inflated to close off the edge when the reactive mixture approaches the edge. Inflation of the inflatable seal and clamping at the fully closed position are maintained for a gel time of the reactive mixture. After the gel time, the inflatable seal is deflated to vent at least a portion of gas produced by the reaction while maintaining the clamping at the fully closed position for a curing time of the reactive mixture.

6 Claims, 3 Drawing Sheets

SKIN-COVERED ARTICLES WITH REACTION INJECTION MOLDED FOAM LAYER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to reaction injection molding of a foam padding layer between a rigid substrate and a skin covering layer for automotive interior trim panels, and, more specifically, to a method of de-gassing during formation of the foam layer.

A common type of padded or "soft" interior trim panel for transportation vehicles can be made using a foam-in-place manufacturing technique. The trim panel is a composite article comprising a rigid substrate carrying a foam layer and covered by a flexible skin. The substrate and skin are separately made and then loaded into a reaction-injection molding (RIM) tool where a reactive mixture which starts out as a liquid is injected into a space between the substrate and skin. The constituents of the reactive mixture react to form the foam, which is allowed to cure and the composite article is then removed from the RIM tool.

Foam-in-place panels have been used for door panels and instrument panels in automobiles, for example. An instrument panel may include a rigid substrate that is injection molded with a shape that provides a desired contour and support for mounting various accessories. For example, a passenger air bag system may be assembled onto the substrate behind a seamless (i.e., hidden) door that forms or is attached as part of the substrate. During deployment, the air bag forces open the door which tears through the foam and skin to allow the air bag to enter the passenger compartment.

Conventional foam-in-place articles have been subject to problems in which the foam layer insufficiently adheres to the substrate. This problem is especially acute in an instrument panel having a steel air bag door forming part of the substrate. Due to differences in adherence between the foam layer and the air bag door as compared to surrounding plastic areas of the substrate, a smooth and even surface of the skin is not obtained. Instead, imperfections such as waviness or other "read-through" of the door onto the outer surface can be seen. Moreover, when the foam lacks sufficient adherence to the air bag door, pieces of the foam may become loose during deployment of the air bag when the foam and skin are torn by the door. The presence of flying debris during a vehicle crash is undesirable.

A typical foam is comprised of a polyurethane produced by mixing polyol and isocyanate. This reaction also produces carbon dioxide gas as a byproduct inside the RIM tool. The RIM tool acts as a closed mold which must be de-gassed before final curing of the article in order to avoid bubbles forming under the skin. The conventional solution for de-gassing has been to drop the RIM tool out of clamp (i.e., opening the RIM tool at least slightly in order to depressurize the interior mold cavity). However, the need for de-gassing occurs prior to full curing of the foam. This can result in less than full adherence of the foam to the substrate. In particular, a steel air bag door may not yet have been sufficiently heated by the reactive mixture to obtain good foam adherence to the door. Some improvement has been obtained in the prior art by preheating the steel air bag door prior to placing it in the RIM tool. However, such a heating step is undesirable and does not always achieve the desired results.

SUMMARY OF THE INVENTION

The present invention achieves de-gassing of a RIM foam-in-place composite article while maintaining full foam adherence to all parts of the substrate and avoiding any read-through or other imperfections on the skin surface.

In one aspect of the invention, a method is provided for forming a composite article having a reaction-injection mold (RIM) foam layer between a substrate and a flexible skin in a RIM tool having at least one inflatable seal defining an edge of the foam layer. The RIM tool is clamped in a fully closed position over the substrate and skin. A reactive mixture is injected into a space between the substrate and skin with the inflatable seal being deflated, wherein the reactive mixture produces a gas during a reaction producing the foam layer. The inflatable seal is inflated to close off the edge when the reactive mixture approaches the edge. Inflation of the inflatable seal and clamping at the fully closed position are maintained for a gel time of the reactive mixture. After the gel time, the inflatable seal is deflated to vent at least a portion of the gas while maintaining the clamping at the fully closed position for a curing time of the reactive mixture. Then the RIM tool is unclamped to remove the composite article.

DETAILED DESCRIPTION OF PREFERRED EMBODIMENTS

Figure 1:
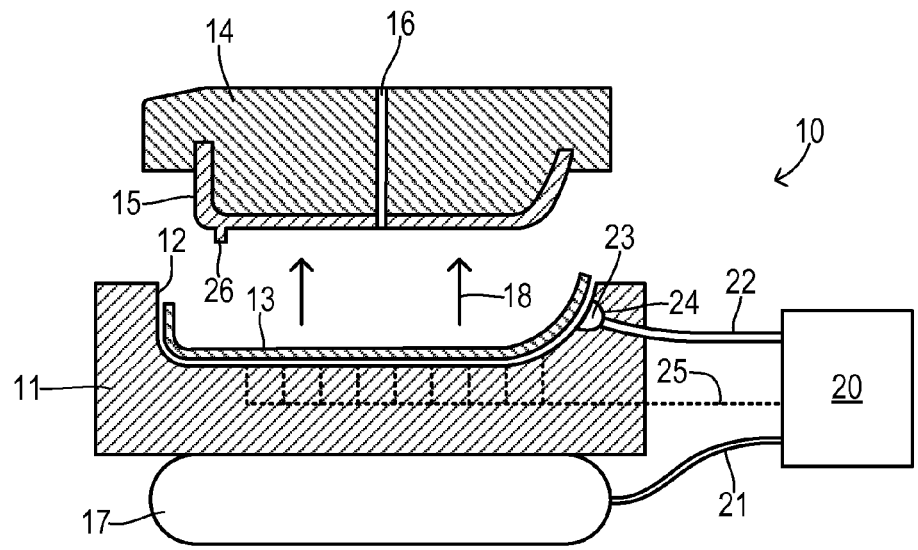
FIG. 1 is a cross section of a RIM tool, substrate, and skin prior to formation of an intermediate foam layer.
Figure 2:
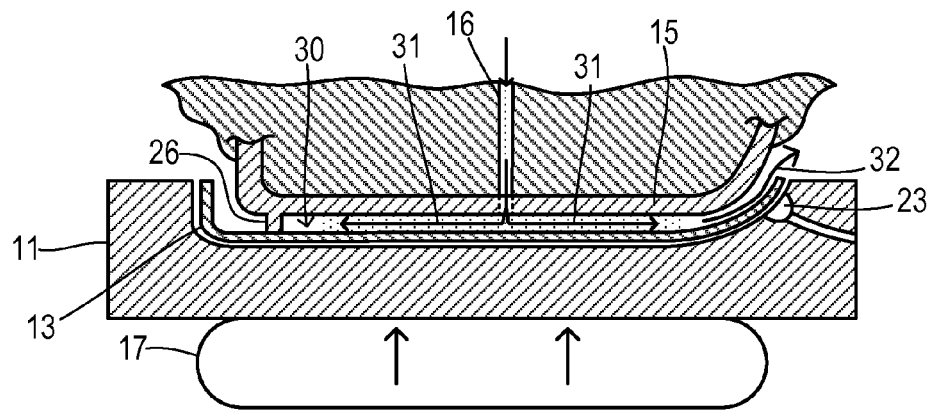
FIG. 2 is a cross section of the RIM tool, substrate, and skin during injection of a reactive mixture forming the foam layer.

Referring to FIG. 1, a manufacturing system 10 includes a lower RIM tool 11 having a cavity 12 adapted to receive an elastomeric skin 13. An upper fixture 14 secures a substrate 15 which preferably comprises an injection molded support structure for an automotive instrument panel, door panel, or the like. A line 16 is provided through fixture 14 and substrate 15 for injecting a reactive mixture from feed tanks (not shown) via conventional pumps and supply lines as known in the art. RIM tool 11 can be raised and lowered by inflating or deflating a supporting air bag 17. RIM tool 11 can be raised in the direction of arrows 18 to reach a fully closed position which is shown in FIG. 2.

A control system 20 may include an electronic controller, pneumatic and/or hydraulic pumps, and other known types of sensors and actuators for operating the RIM manufacturing system 10. A fluid line 21 supplies an inflation fluid to air bag 17 and a fluid line 22 supplies an inflation fluid to an inflatable seal 23 residing in a channel 24 formed in the surface of cavity 12. A system of vacuum lines 25 may also be provided within RIM tool 11 for providing suction at the surface of cavity 12 to better retain skin 13 in its desired position after it is loaded.

Certain measures are taken in order to confine the injected liquid reactive mixture to certain areas on the substrate. Various structures may be provided to define the edges of the space into which the foaming reactive mixture will flow when it is injected into a space between substrate 15 and skin 13. For example, substrate 15 may include a projecting wall 26 for abutting skin 13 to define one edge of the foam layer. Similarly, foam edges can be defined by providing an appropriate recess within substrate 15.

Inflatable seal 23 is another example of a technique for defining an edge of the foam layer. The use of an inflatable seal is particularly helpful when an edge of the foam layer occurs on a surface of substrate 15 that is not perpendicular to direction 18 (i.e., where there is reduced force pressing the skin and substrate together). Inflatable seal 23 is configured to follow a corresponding edge of the foam layer and may be inflated when needed to close off the corresponding edge when the flowing reactive mixture approaches the edge as described below.

Figure 3:
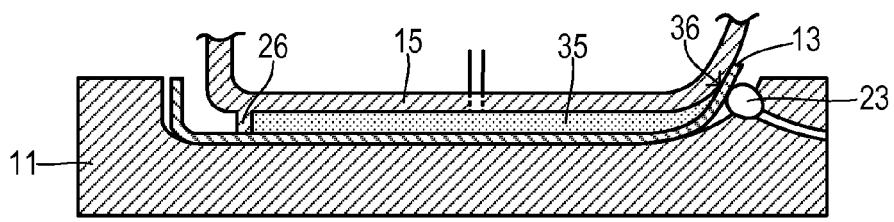
FIG. 3 is a cross section showing the inflation of the inflatable seal to locate an edge of the foam layer.

FIG. 2 shows the RIM tool in a fully closed position in which substrate wall 26 contacts skin 13 along one edge of the desired foam layer. A space 30 between substrate 15 and skin 13 defines the area where the foam layer is desired. The reactive mixture is injected via line 16 and flows into space 30 along arrows 31. As reactive mixture enters space 30, air resident in space 30 needs to be removed. Substrate wall 26 may include vent holes or other conventionally known features for allowing the evacuation of air as the reactive mixture flows into space 30. Inflatable seal 23 remains deflated during the liquefied flow of the reactive mixture to allow an outflow of air 32. As shown in FIG. 3, inflatable seal 23 is inflated to close off the corresponding edge 36 of the foam layer when the reactive mixture approaches edge 36. Thus, the resulting foam layer 35 extends between edge 36 and substrate wall 26 to provide the desired padding layer behind skin 13.

Figure 4:
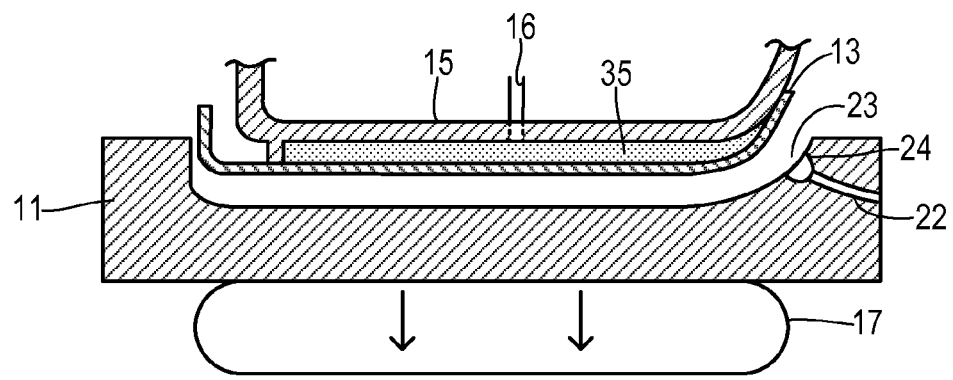
FIG. 4 is a cross section showing the prior art technique of opening (i.e., unclamping) of the RIM tool to de-gas prior to completion of the curing time.
Figure 5:
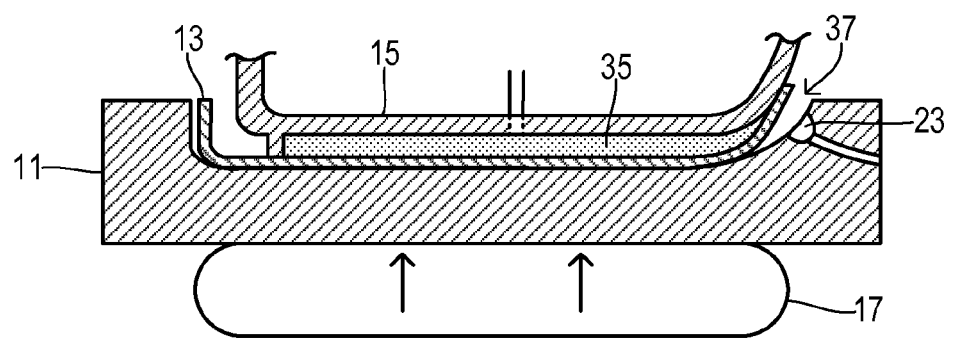
FIG. 5 is a cross section showing an embodiment of the invention wherein the inflatable seal is deflated after a gel time and the clamping of the RIM tools is maintained for the curing time.

As previously explained, de-gassing is required before full curing of foam layer 35 after it reaches the edges as shown in FIG. 3. If not vented, the gasses produced may collect to form a bubble which is visible at the skin. Conventionally, de-gassing is performed by lowering RIM tool 11 as shown in FIG. 4. By removing the clamping pressure as a result of deflating air bag 17, gaseous byproducts from the reactive mixture are allowed to exit foam layer 35 along the appropriate edges. However, opening of RIM tool 11 before substantial curing of foam layer 35 results in decreased adherence of foam layer 35 to substrate 15 due at least in part to a loss of the heat of reaction. The present invention provides an improved method based on the realization that improved composite articles without read-through can be made by maintaining full clamping of the RIM tool until substantial curing has occurred.

The present invention achieves venting of at least a portion of the gaseous byproducts while maintaining clamping of the RIM tool at the fully closed position by deflating inflatable seal 23 at the time that de-gassing becomes necessary. It has been found that foam layer 35 becomes non-flowable prior to the time at which it becomes fully cured. The loss of the ability to flow allows inflatable seal 23 to be deflated without any resulting movement of foam layer 35. The opening of seal 23 provides sufficient de-gassing so that opening of the RIM tools is unnecessary.

The composition of the reactive mixture together with other parameters such as the mixture temperature and the thickness of foam layer 35 determines a gel time (which is defined as the time required for the polymerization reaction to progress to a point where the material can no longer flow). By opening seal 23 after the gel time, the gas is vented and the RIM tool can remain clamped at the fully closed position for a longer curing time of the reactive mixture. Consequently, no heat is lost, and full adherence is obtained between foam layer 35 and substrate 15 and skin 13.

Figure 6:
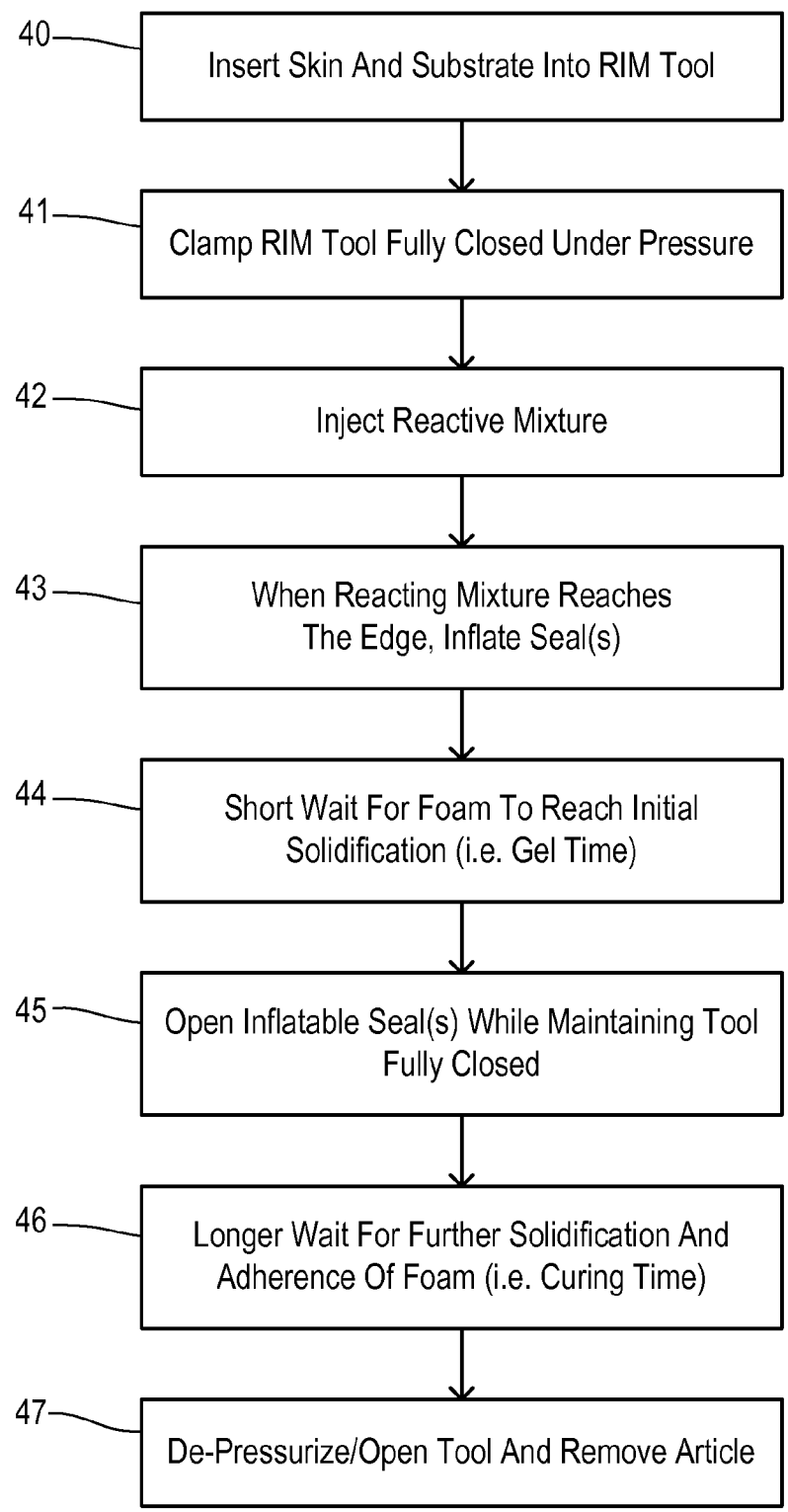
FIG. 6 is a flowchart showing a preferred method of the invention.

A preferred embodiment of a method of the invention is summarized in FIG. 6. The skin and substrate are inserted into the RIM tool in step 40. In step 41, the RIM tool is clamped in the fully closed position under an appropriate pressure to maintain a seal in areas where the substrate contacts the skin. The reactive mixture is injected into the space between the substrate and skin in step 42 while the inflatable seal remains deflated. As the reactive mixture flows into the space and fills the desired areas, the inflatable seal (or seals if more than one separate edge is defined by a respective seal) is inflated in step 43 to close off the corresponding edge when the reactive mixture approaches the edge. The reaction of the mixture progresses in step 44 during a short wait (e.g., equal to or greater than the gel time) for the foam to reach an initial solidification. After the gel time, the inflatable seals are opened in step 45 while maintaining the RIM tool fully closed. In step 46, the polymerization reaction continues for a longer time period (i.e., a curing time) to allow further solidification and adherence of the foam to the composite articles. In one typical example in which the reactive mixture is comprised of polyol and isocyanate, the gel time may be in the range of about 35 to about 48 seconds and the additional curing time may be about 80 seconds. The exact times for seal inflation and deflation during the manufacturing cycle may be electronically programmable according to the needs of any particular design. In step 47, the RIM tool is de-pressurized (i.e., unclamped), the tool is opened, and the finished composite article is removed.

What is claimed is:

1. A method of forming a composite article having a reaction-injection mold (RIM) foam layer between a substrate and a flexible skin in a RIM tool having at least one inflatable seal defining an edge of the foam layer, comprising steps of:
    clamping the RIM tool in a fully closed position over the substrate and flexible skin; injecting a reactive mixture into a space between the substrate and flexible skin with the inflatable seal being deflated, wherein the reactive mixture produces a polyurethane and a gas during a reaction producing the foam layer;
    inflating the inflatable seal to close off the edge when the reactive mixture approaches the edge;
    maintaining inflation of the inflatable seal and clamping at the fully closed position for a gel time of the polyurethane reactive mixture;
    after the gel time, deflating the inflatable seal to vent at least a portion of the gas while maintaining the clamping at the fully closed position for a curing time of the polyurethane reactive mixture; and
    unclamping the RIM tool to remove the composite article.

2. The method of claim 1 wherein the inflatable seal is configured to press the flexible skin against the substrate when inflated.

3. The method of claim 2 wherein the RIM tool includes a channel corresponding to the edge of the foam layer, and wherein the inflatable seal is disposed in the channel.

4. The method of claim 1 wherein the composite article is an interior trim panel for a transportation vehicle.

5. The method of claim 1 wherein the substrate is comprised of an injection-molded thermoplastic and wherein the flexible skin is comprised of a flexible elastomer.

6. The method of claim 5 wherein the reactive mixture is comprised of polyol and isocyanate.

\* \* \* \* \*